(12) United States Patent
Goyal et al.

(10) Patent No.: US 7,957,404 B1
(45) Date of Patent: *Jun. 7, 2011

(54) METHOD FOR BANDWIDTH MANAGEMENT BY RESIZING PIPES

(75) Inventors: Pawan Goyal, Mountain View, CA (US); Albert Gordon Greenberg, Summit, NJ (US); Partho Pratim Mishra, Millbrae, CA (US); Kadangode K. Ramakrishnan, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/977,602

(22) Filed: Oct. 25, 2007

Related U.S. Application Data

(63) Continuation of application No. 11/240,041, filed on Sep. 30, 2005, now Pat. No. 7,301,964, which is a continuation of application No. 10/895,931, filed on Jul. 21, 2004, now Pat. No. 6,999,474, which is a continuation of application No. 09/464,983, filed on Dec. 16, 1999, now Pat. No. 6,785,233.

(60) Provisional application No. 60/112,484, filed on Dec. 16, 1998.

(51) Int. Cl.
*H04J 3/00* (2006.01)

(52) U.S. Cl. .......................... 370/401; 370/468; 370/352

(58) Field of Classification Search .................. 370/401, 370/468, 352
See application file for complete search history.

(56) References Cited

U.S. PATENT DOCUMENTS

| | | | |
|---|---|---|---|
| 5,463,620 A * | 10/1995 | Sriram | 370/412 |
| 6,331,986 B1 * | 12/2001 | Mitra et al. | 370/468 |
| 6,418,139 B1 * | 7/2002 | Akhtar | 370/356 |
| 6,590,885 B1 * | 7/2003 | Jorgensen | 370/338 |
| 6,614,781 B1 * | 9/2003 | Elliott et al. | 370/352 |
| 6,999,474 B1 * | 2/2006 | Goyal et al. | 370/468 |
| 7,274,662 B1 * | 9/2007 | Kalmanek et al. | 370/230 |

* cited by examiner

*Primary Examiner* — Dang T Ton
*Assistant Examiner* — Pamit Kaur

(57) ABSTRACT

Signaling messages are exchanged for a call between a calling party to a called party. A setup message for the call is exchanged through at least one gate controller. Network resources are reserved for the call based on the exchanged setup messages. An end-to-end message for the call is exchanged without the end-to-end message being routed through the at least one gate controller.

7 Claims, 3 Drawing Sheets

METHOD FOR BANDWIDTH MANAGEMENT BY RESIZING PIPES

CROSS REFERENCE TO RELATED APPLICATIONS

This application is a continuation of application Ser. No. 11/240,041, entitled "Method for Bandwidth Management by Resizing Pipes," filed on Sep. 30, 2005, now U.S. Pat. No. 7,301,964, issued Nov. 27, 2007, which is a continuation of application Ser. No. 10/895,931, entitled "Method for Bandwidth Management by Resizing Pipes," filed on Jul. 21, 2004, now U.S. Pat. No. 6,999,474, issued Feb. 14, 2006, which is a continuation of application Ser. No. 09/464,983, entitled "Method for Bandwidth Management by Resizing Pipes," filed on Dec. 16, 1999, now U.S. Pat. No. 6,785,233, issued Aug. 31, 2004, which claims the benefit of U.S. Provisional Patent Application Ser. No. 60/112,484 filed Dec. 16, 1998, the contents of which is incorporated by reference herein.

This application is related to the following pending, commonly assigned patent applications all filed on Aug. 4, 1999: "A Method for Allocating Network Resources" (Ser. No. 09/366,207, now U.S. Pat. No. 6,483,912, issued Nov. 19, 2002), "A Method for Performing Gate Coordination on a Per-Call Basis" (Ser. No. 09/366,208, now U.S. Pat. No. 6,757,290, issued Jun. 29, 2004), "A Method for Establishing Call State Information without Maintaining State Information at Gate Controllers" (Ser. No. 09/366,210, now U.S. Pat. No. 6,694,429, issued Feb. 17, 2004), "A Method for Providing Privacy by Network Address Translation" (Ser. No. 09/366,678, now U.S. Pat. No. 6,870,845, issued Mar. 22, 2005), and "A Method for Exchanging Signaling Messages in Two Phases" (Ser. No. 09/366,676, now U.S. Pat. No. 6,324,279, issued Nov. 27, 2001), the contents of which are incorporated by reference herein.

BACKGROUND OF THE INVENTION

The present invention generally relates to allocating network resources. More specifically, the present invention relates to reserving and committing network resources based on an authorized quality of service.

The known signaling architecture H.323 is an International Telecommunications Union (ITU) defined standard that describes how multimedia communications occur between terminals, network equipment and services on local area networks (LANs) and wide area networks (WANs) that do not provide a guaranteed quality of service (such as Internet Protocol (IP) networks). Quality of service is a measure of communication service quality during a call, and can include, for example, the bandwidth, delay and latency associated with the call. In networks using connectionless "best effort" delivery models, the quality of service typically is not guaranteed; the H.323 is a signaling architecture for such a network.

The H.323 provides a range of implementation options including gatekeeper-routed signaling. In the H.323 standard, gatekeepers map LAN address aliases to IP addresses and provide address lookups when needed. Gatekeepers also exercise call-control functions to limit the number of H.323 connections and the total bandwidth used by these connections in an H.323 "zone." Although the gatekeeper is not necessary within the H.323 standard, when a gatekeeper is present in a network, network terminals must make use of its services. In other words, gatekeepers maintain state information for each individual call and all call signaling must pass through the gatekeepers.

The gatekeeper implementation of the H.323 standard, however, suffers several shortcomings. First, the equipment associated with gatekeepers needs to be extremely reliable so that the gatekeeper is available throughout the course of the call. If the gatekeeper-related equipment fails during a call, the call fails because the state information for the call maintained solely at the gatekeeper is lost. Second, the gatekeeper-related equipment likely cannot scale in a cost effective manner because maintaining the state information and performing the messaging associated with H.323 is complex and processor intensive. Finally, theft of service is possible by bypassing the gatekeepers to place unauthorized and unmonitored calls.

SUMMARY OF THE INVENTION

Signaling messages are exchanged for a call between a calling party to a called party. A setup message for the call is exchanged through at least one gate controller. Network resources are reserved for the call based on the exchanged setup messages. An end-to-end message for the call is exchanged without the end-to-end message being routed through the at least one gate controller.

Call flows are aggregated into a single queue and a scheduling algorithm is used to partition bandwidth between the call flows and other classes of traffic. Per-flow signaling is only required near the edges of the network. This is achieved by introducing the abstraction of a pipe: a logical path, with a fixed bandwidth between non-contiguous "aggregation" routers across the backbone. Admission control decisions for a call flow are made at the aggregation routers on either end of a pipe and do not require per-flow processing of signaling messages by the backbone routers. Backbone routers participate in the (coarser grained) signaling used to create a pipe or to re-provision the bandwidth associated with a pipe.

DETAILED DESCRIPTION

Embodiments of the present invention relate to a communications system having a combination of different types of networks, such as a data network(s) (based on, for example, packet switching), a telephone network(s) (such as the Plain Old Telephone Network (PSTN)), and/or a cable network(s). Such a communications system can include intelligent end-terminals that allow a service provider to provide various types of services involving the different types of networks and to exploit the capabilities of the end-terminals. For example, packet telephony can be implemented in embodiments of the present invention where voice can be received and transmitted by a telephone or a communication device (such as a personal computer) connected to the data network via a cable network.

Embodiments of the present invention relate to call authorization, call signaling, network resource management and end-to-end signaling between communication devices (e.g., telephones, personal computers, etc.). Existing telephone services with a service quality consistent with current standards can be supported while a broader range of packet-enabled communications services can also be supported. Embodiments of the present invention allow pricing and billing of communications services to differ based on the differences in service quality (e.g., bandwidth, delay and/or latency) for the various calls.

The following discussion is separated into sections for clarity. First, a system overview of a communication network, according to an embodiment of the present invention, is discussed in Section 1 entitled "System Overview". Then, separate aspects of embodiments of the present invention are considered: Section 2 entitled "Two-Phase Resource Reservation" and Section 3 entitled "Backbone Resource Reservation".

1. System Overview

Figure 1:
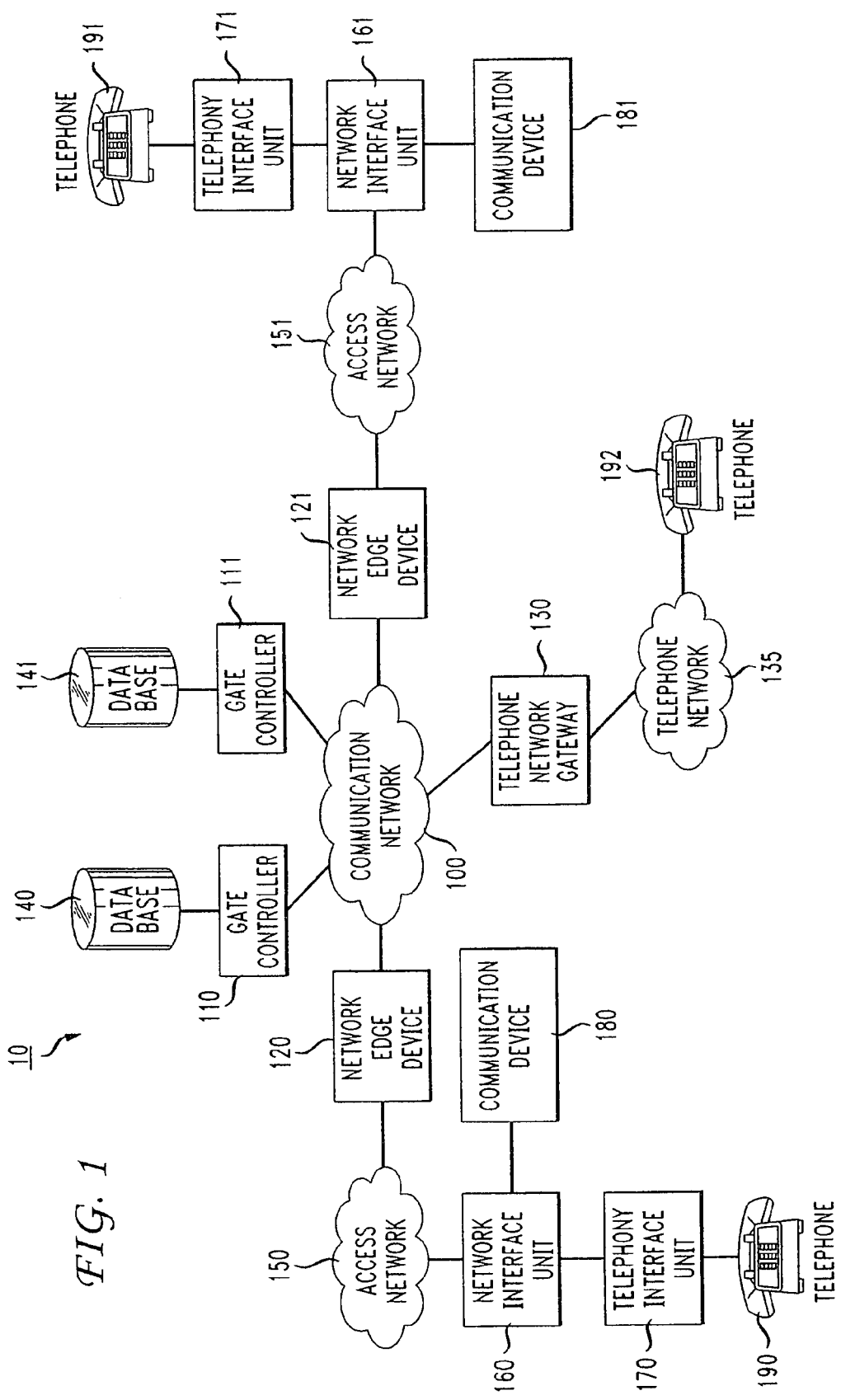
FIG. 1 illustrates a network, according to an embodiment of the present invention.

FIG. 1 illustrates a network according to an embodiment of the present invention. Network 10 includes communication network 100 which is connected to gate controller 110 and gate controller 111, network edge devices 120 and 121, and telephone network gateway 130. Gate controllers 110 and 111 are connected to database storage 140 and 141, respectively. Network edge devices 120 and 121 are connected to access networks 150 and 151, respectively. Access networks 150 and 151 are connected to network interface units 160 and 161, respectively. Network interface units 160 and 161 are connected to telephone interface units (TIUs) 170 and 171, respectively, and communication devices 180 and 181, respectively. TIUs 170 and 171 are connected to telephones 190 and 191, respectively. Telephone network gateway 130 is connected to telephone network 135 which, in turn, is connected to telephone 192.

Communication network 100 can be a network that supports, for example, Internet Protocol (IP) signaling, IP media transport, and/or asynchronous transfer mode (ATM) media transport. Access networks 150 and 151 can be networks of wires or fibers capable of carrying voice and/or data transmissions. The telephone network 135 can be, for example, the Plain Old Telephone System (PSTN).

Network interface units 160 and 161 can be, for example, cable modems designed for use on a television coaxial cable circuit. Network interface units 160 and 161 allow communication devices 180 and 181, respectively, to connect to access networks 150 and 151, respectively. Network interface units 160 and 161 also allow TIUs 170 and 171, respectively (and in turn telephones 190 and 191, respectively), to connect to access networks 150 and 151, respectively.

Network edge devices (NEDs) 120 and 121 are devices located at the edge of the communication network 100 that connects the communication network 100 to the access networks 120 and 121, respectively. The network edge devices can be, for example, routers or bridges or similar equipment that can connect communication network 100 to access networks 150 and 151. Because NEDs 120 and 121 can be specifically implemented as, for example, routers at the network edge, these units are also referred to herein as edge routers (ERs).

Network edge devices 120 and 121 can implement resource management and admission control mechanisms that allow the communication network 100 to provide assurances of bounded per-packet loss and delay required to assure an authorized quality of service for a call. In other words, network edge devices (e.g., network edge devices 120 or 121) can obtain authorization from an associated gate controller (e.g., gate controller 110 or 111, respectively) on a call-by-call basis before providing access to, for example, enhanced quality of service across the communication network. Said another way, the network edge devices can ensure that enhanced quality of service for a call of a particular party has been authorized and for which usage accounting is being done. Network edge devices can generate accounting records for calls because these devices track the resource usage within the communication network 100 for the calls. Network edge devices can also implement Network Address Translation to support address privacy for called paries and/or calling parties, as described more fully below.

TIUs 170 and 171 are gateways between telephones and packet-carrying networks, such as access networks 150 and 151 and communication network 100. TIUs 170 and 171 can digitize, compress and packetize voice signals from telephone 190 and 191, respectively, to convert analog voice into data packets for transport over the communication network 100, and vice versa. TIUs 170 and 171 can be, for example, a simple stand-alone telephony device that incorporates the broadband interface, a high-speed data cable modem that incorporates the interface unit (i.e., TIUs and their associated network interface units can be combined into a single device), or an advanced digital set-top box that incorporates the broadband interface. TIUs 170 and 171 can be for example broadband interfaces for telephones; consequently, these units are also referred to herein as broadband telephony interfaces (BTIs).

TIUs contain sufficient processing and memory to perform signaling and call control functions. More specifically, TIUs 170 and 171 each include a processor and is capable of detecting changes in state information (e.g., hook state detection), collecting dialed digits (e.g., dual-tone multifrequency (DTMF) signals), and participating in the implementation of telephone features for telephones 190 and 191, respectively. TIUs 170 and 171 can also participate in end-to-end capability negotiation as described below.

Note that the term "end-to-end" refers the association between two end points for a call. For example, where a call involves a calling party and a called party using telephones, the end-to-end association for the call can be between the two telephony interface units. Thus, end-to-end messages for example would include messages originating at one telephone interface unit and terminating at the other telephony interface unit where the messages are opaque to other network entities that merely forward the messages (possibly after performing network address translation as described below). For example, end-to-end messages can be routed between telephone interface units with messages being forwarded by the network edge devices and without the message being routed through the gate controllers. Alternatively, for example, where a call involves a calling party using a telephone and a called party using a communication device (such as a personal computer), the end-to-end association for the call can be between the calling party telephony interface unit and the called party network interface unit.

TIUs can maintain information for calls while in progress, thereby implementing certain service features locally. For example, call waiting can be implemented locally, by detecting hook flash and controlling the active call. Similarly, return call can be implemented locally by retaining state information in the TIUs about the most recent calls.

Note that TIUs 170 and 171 are considered to be "untrusted" devices in the sense that the TIUs can operate locally-stored software and are not necessarily under the direct control of the service provider (e.g., the entity operating the communication network 100). Because the TIUs are untrusted devices, information passed to the TIUs can be first encrypted before it is given to the TIUs to guarantee privacy. For example, state information can be passed from the gate controllers 110 and/or 111 to the TIUs which store the state information for their later use (thereby avoiding the need to maintain state information for a call at the gate controllers) by first encrypting the state information; the state information retrieved from the TIUs can be verified subsequently via known encryption techniques.

In addition to encrypting the state information for the TIUs to maintain, a cryptographic hash function can be applied to the state information to detect the integrity of the state information (i.e., detect whether the state information has been altered by an untrusted entity). By applying a cryptographic hash value to the state information, a hash value is produced which can be sent to and maintained by the TIUs. As a result, when the state information is retrieved from a TIU, the cryptographic hash function can be applied to this retrieved state information; if the same hash value is produced, then the retrieved state information has not been altered at, for example, the TIU. The cryptographic hash functions can be, for example, a modification detect codes (MDCs) or message authentication codes (MACs).

Gate controllers 110 and 111 are adjunct platforms that have access to authentication databases and customer profile information on database storage 140 and 141, respectively. Gate controllers 110 and 111 implement a set of service-specific control functions to support communication services, such as authentication and authorization, number translation and call routing, service-specific admission control, and signaling and service feature support.

The gate controllers can authenticate signaling messages and authorize requests for service so that communication services and certain service features are only provided to authorized subscribers. In other words, upon receiving a setup request message from a calling party, the gate controller can authenticate the identity of the calling party and authorize the service sought by the calling party.

The gate controllers can translate dialed telephone numbers to communication network addresses (such as, for example, IP addresses) based on call routing logic. For example, an originating gate controller (e.g., gate controller 110) can translate a dialed telephone number to a communication network address associated with the terminating gate controller (e.g., gate controller 111). The terminating gate controller can subsequently translate the communication network address to the terminating end-point (e.g., BTI 171) to which the call should be routed. In an alternative embodiment, a single dial telephone number can be mapped to multiple communication network addresses, for example, to allow the signaling and media end-points associated with a call to be distinct.

The gate controllers can implement a broad range of service-specific admission control policies for the communication services. For example, the gate controllers can provide precedence for particular call (e.g., 911 emergency calls). The gate controllers can perform admission control to implement overload control mechanisms similar to those used in the convention telephone network (e.g., telephone network 135), for example, to restrict the number of calls to a particular location or to restrict the frequency of call setup to avoid signaling overload. These mechanisms can be invoked either dynamically or under administrative control.

The gate controllers can perform signaling and service feature support where the service features cannot be supported solely by the TIUs. For example, certain service features such as call transfer require changing the end-points participating the calls; in such a case, the gate controllers change the gate parameters because call transfer requires reauthorization by the gate controllers. Service features that depend on the privacy of the calling information, such as caller-ID blocking, are implemented by the gate controllers. In addition, service features that require users to receive a consistent view of feature operation even when a TIU is inoperative are implemented by the gate controllers. For example, the gate controllers can control call forwarding when a TIU for a call is inoperative.

Gate controllers can be organized in domains where each gate controller is associated with a set of TIUs and the network edge devices that serve those TIUs. Although the TIUs are not trusted entities, a trust relationship exists between an network edge device and its associated gate controller because the gate controller acts as a policy server controlling when the network edge device can provide enhanced quality of service. A trust relationship can also exist between gate controllers.

A gate controller can act as a simple transaction server so that a failure of a gate controller does not affect associated calls that are in process. In one embodiment, a gate controller domain can include a primary and a secondary gate controller. If the primary gate controller fails, only calls in a transient state are affected (i.e., calls that are being established including, for example, where network resources are being allocated). The TIUs associated with those affected calls in a transient state will try to be established on the secondary gate controller after a time-out period has elapsed. All active calls (i.e., calls in progress) are unaffected by the failure of a primary gate controller because the gate controller does not retain state information for these stable, active calls. As a result, gate controllers easily and efficiently scale as more gate controllers for the communication network are required.

Telephone network gateway 130 can include a combination of a trunking gateway (not shown) and a signaling gateway (not shown). The trunking gateway can convert between a data format used on the data network 100 and the pulse code modulation (PCM) format typically used for transmission over the telephone network 135. The signaling gateway can provide signaling internetworking between signaling protocols of embodiments of present invention described below and conventional telephony signaling protocols such as ISUP/SS7 (i.e., Integrated Services Digital Network User Part/Signaling System 7). In an alternative embodiment, a media gateway control protocol can be used to control the operation of a media gateway separate from a signaling gateway.

Although not shown in FIG. 1, additional network entities (not shown) can be included in the network 10. For example, the gate controllers can use other servers to implement the authorization or the translation functions. Similarly, three way calling can be supported using audio bridges in the network 10.

Note that although a limited number of network entities are shown in FIG. 1 for simplicity of presentation, other network entities can be included in network 10. For example, although only a sole network interface unit (e.g., a cable modem) is shown connected to a sole network interface unit, multiple network interface units are likely connected to each access network. Similarly, although only a few network edge devices, a few gate controllers and a sole telephone network gateway are shown connected to the communication network 100, many such devices can be connected to the communication network 100. Many other variations to the network 10 shown in FIG. 1 are possible.

2. Two-Phase Network Resource Reservation

In embodiments of the present invention, network resources for a call between a calling party and a called party are allocated. The network resources for the call are reserved based on a reservation request. The network resources are reserved before any one network resource from the reserved network resources is committed. The reserved network resources for the call are committed when a called party indicates acceptance for the call.

The term "network resources" is used herein as the facilities of a communications network required for a call and any auxiliary services associated with that call. Network resources can include, for example, the capabilities or capacities of equipment within the communications network needed to establish and maintain a call at an appropriate quality of service. The equipment within the communications network can include, for example, routers, bridges and gateways within the communications network.

The called party "indicates acceptance" for the call in a number of ways. For example, where the called party is using a telephone 190, the called party can indicate acceptance for the call by picking up the telephone hand set thereby causing an off-hook condition. Where the called party is using a communication device 181 (e.g., a personal computer), the called party can indicate acceptance by making an appropriate selection with the communication device 181 that initiates handshake signaling (i.e., a personal computer equivalent for an off-hook condition). Where the called party has an answering machine, the answering machine timer can expire to connect the call.

Network resources are "reserved" in the sense that the network resources required for a particular call can be identified before the called party is actually connected to the calling party. These network resources can be reserved through the appropriate signal messages collectively referred to herein as a "reservation request". After the appropriate network resources have been reserved based on the reservation request, these network resources are committed when the called party indicates acceptance for the call. By committing the network resources only when the called party indicates acceptance for the call, the accounting for the call can, for example, accurately track the time of the actual call while excluding the time of the call setup.

Network resources are "committed" in the sense that an available network resource operates such that the voice information between the calling party and the called party is transported. Before the network resources are committed, the network resources are allocated for the call but are not configured to actually carry the voice information for the call. By committing the reserved network resources once the called party indicates acceptance for the call, the network resources are not wastefully configured before they are actually needed. This can be particularly relevant for portions of the communication network where resources are limited, such as, for example, the upstream resources within the cable network.

The term "quality of service" is used herein to include, but not limited to, the measure of telecommunication service quality provided during a call. The quality of service can be specified by a calling party, a called party or the service provider of the communications network, or any combination thereof. In other words, the quality of service is "authorized" in the sense that the calling party and/or the called party specify a quality of service for the call and the service provider can verify the specified quality of service for the call. For example, a calling party transferring data (e.g., rather than transferring solely voice) may subscribe for a service with a quality of service having a large bandwidth and small latency; in such an example, a service provider can verify the service subscription for the particular quality of service associated with the call for that particular calling party.

Figure 2:
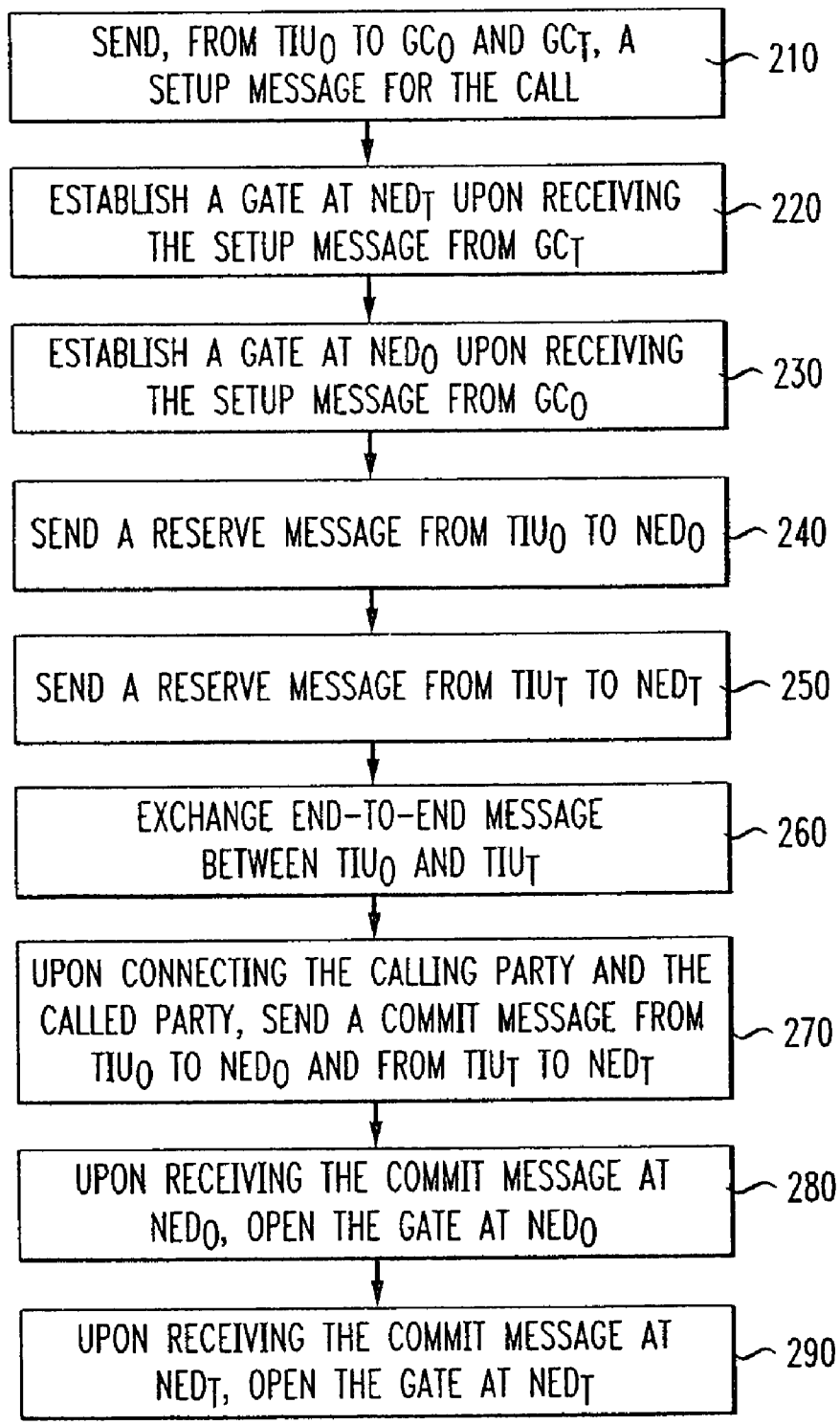
FIG. 2 illustrates a flow chart to reserve network resources for a call, according to an embodiment of the present invention.

FIG. 2 illustrates a flow chart to reserve network resources for a call, according to an embodiment of the present invention. FIG. 2 is a simplified view of the connection process to better illustrate the two-phase allocation of network resources. This process is in two phases in the sense that network resources are first reserved and then committed in separate and distinct phases. In other words, network resources are reserved first; once the reservation process is complete, then the reserved network resources can be committed. Other aspects of the overall process will be described in further detail in other sections below.

Note that components of the communications networks shown in FIG. 1 are referred to in FIG. 2 for convenience with the shorthand notation: originating TIU 170 ($TIU_O$), originating network edge device 120 (NEW, originating gate controller 110 ($GC_O$), terminating gate controller 111 ($GC_T$), terminating network edge device 121 ($NED_T$), and terminating TIU 171 ($TIU_T$).

At step 210, a setup message for a call between a calling party and a called party is sent from the originating TIU 170 to the originating gate controller 110 and the terminating gate controller 111. For example, upon receiving the setup message at the originating gate controller 110, the setup message (possibly modified with additional information) can be forwarded to the terminating gate controller 111 through communication network 100. In one embodiment, the setup message can be, for example, in the form of the SETUP message described below in Section 7 entitled "Protocol Description".

At step 220, a gate for the call is established at the terminating network edge device 121 upon receiving the setup message from terminating gate controller 111. A "gate" is a call-admission control mechanism that uses, for example, known packet filters at the edge routers. At step 230, another gate for the call is established at the originating network edge device 120. In one embodiment, the gates can have associated time limits on the gate duration; such a features can allow the calls to be limited where, for example, the calls are established with a pre-paid calling card that has a limited amount of calling time that is pre-paid.

Note that by establishing the gates at the originating and terminating network edge devices rather than at the corresponding gate controllers, the state information for the call is maintained at a network entity through which the call is routed. In other words, state information for a call can be maintained without maintaining the state information at a gate controller. Consequently, if a gate controller fails after the gates have been established for a call, the call can be maintained. The establishment of gates for a call are discussed more fully below in the Section 4 entitled "Gate Coordination on a Per-Call Basis".

At step 240, a reserve message is sent from the originating TIU 170 to the originating NED 120. At step 250, a reserve message is sent from the terminating TIU 171 to the terminating NED 121. The reserve messages sent by the originating TIU 170 and terminating TIU 171 are a part of the reservation process where an allocation of network resources is requested but the network resource need not yet be assigned or committed. Allocating the network resources includes the verifying that the quality of service desired by a TIU is no greater than the quality of service authorized by the corresponding gate controller; the gate controller authorizes a quality of service for a call using the authentication databases and customer profile information on the associated database storage (e.g., database storage 140 and 141).

To provide telephone-grade service over network 10, the network 10 can provide bounded per-packet loss and delay for the voice packets of a call by performing active resource management both in the access network 150 and 151, and communication network 100. Because the network edge devices (e.g., NEDs 120 and 121) within the connection path for a call may have capacity constrained links, reservation requests for a call (and any associated messages) are forwarded end to end, thereby ensuring that network resources are available end to end. In one embodiment, because the access networks 150 and 151 may be capacity constrained (at least in the upstream direction), resource management is performed on a per-call basis for the access networks 150 and 151.

Resource management in the communication network 100, however, can be performed on a per-call basis or on a coarse-grained resource basis (i.e., resources within the communication network 100 can be reserved for multiple calls at a given time). Resource management within portions of the communication network 100 may be performed on a per-call basis because some network edge devices with the communications network 100 may not have sufficient processing capacity to process a large number of reservation messages typical for high volume call traffic. Alternatively, resource management within portions of the communication network 100 may be performed on a multiple-call basis if these portions of the communication network 100 are adequately provisioned (i.e., sufficient capacity has been reserved by a multiple-call reservation); in such cases, network edge devices within these portions of communication network 100 need not perform per-call admission control. Consequently, in an embodiment of the present invention, some network edge devices do per-flow admission control to interpret reservation requests while other network edge devices that are in capacity-rich regions of the data network 100 are provisioned to simply forward these messages without interpretation.

Embodiments of the present invention can perform resource reservation in the communication network 100 in a uni-directional manner which thereby compensates for routing asymmetries. Thus, when the originating TIU 170 sends a reservation request to the originating NED 120 and when the originating TIU 170 receives back an acknowledgment for the reservation request, two aspects are of the connection are confirmed. First, adequate bandwidth for the call is available in both directions over the access networks 150 and 151. Second, adequate bandwidth for the call is available over the communication network 100.

Steps 210 through 240 describe the process of reserving the network resources. At this point, the network resources to be used for the call are reserved, but none of these network resources are yet committed.

At step 250, end-to-end messages are exchanged between the originating TIU 170 and the terminating TIU 171. As previously discussed above, the term "end-to-end" refers the associated between two end points associated with a call. So, where a call involves a calling party and a called party using telephones, the end-to-end association for the call can be between the two telephony interface units; thus, end-to-end messages would include messages originating at one telephone interface unit and terminating at the other telephony interface unit.

The end-to-end messages can include, for example, a ring message from the originating TIU 170 to the terminating TIU 171, a ring back message from the terminating TIU 171 to the originating TIU 170, and a connect message from the terminating TIU 171 to the originating TIU 170. The ring message can signal the terminating telephone 191 to ring thereby indicating an incoming call. The ring back message can signal the originating TIU 170 that the terminating telephone 190 is ringing. The connect message can signal to the originating TIU 170 that the called party has indicated acceptance for the call by, for example, going off-hook. Note that these end-to-end messages can be routed between the originating TIU 170 and the terminating TIU 171 without being routed through the originating gate controller 110 or terminating gate controller 111.

At step 270, upon the calling party and the called party being connected (e.g., upon an off-hook condition by the called party and a connect message being sent), a commit message is sent from the originating TIU 170 to the originating NED 120 and from the terminating TIU 171 to the terminating NED 121.

At step 280, upon receiving the commit message at the originating NED 120, the gate established at the originating NED 120 in step 230 is opened. Similarly, at step 290, upon receiving the commit message at the terminating NED 121, the gate established at the terminating NED 120 in step 220 is opened. At this point when the gates are opened at the originating NED 120 and the terminating NED 121, the reserved network resources are committed. The commit process can include a verification by the NED that the actual quality of service sought by the associated TIU is no greater than the quality of service reserved during the reservation process.

The gate at the originating edge router and the gate at the terminating edge router for each call are opened almost simultaneously (e.g., within a few hundred milliseconds of each other) because, under normal operating conditions, the calling party and the called party send respective Commit message to their respective network edge devices substantially simultaneously. Similarly, under normal operating conditions, the calling party and the called party end the call and send respective release messages to their respective network edge devices substantially simultaneously. Gate coordination prevents billing for incomplete calls and prevents theft of service by two colluding BTIs.

By separating the reservation process from the commit process, embodiments of the present invention advantageously ensure that network resources are available before actually ringing the far-end telephone (e.g., the telephone of the called party). This, of course, advantageously ensures that usage recording is not initiated until the far-end telephone goes off hook. Consequently, call billing excludes calls that are not completed (e.g., where the called party does not answer) and excludes the portion of calls that occur before the called party answers.

Although FIG. 2 describes an embodiment for reserving network resources where the calling party and the called party were using telephones 190 and 191, respectively, through TIUs 170 and 171, respectively, the process can be analogized for a calling party and/or called party using a communication device 180 and/or 181, respectively.

Note that the state information for a call can be maintained without maintaining the state information at a gate controller. From the perspective of the originating gate controller, a gate setup message for a call is received through a network edge device connecting a trusted network to an untrusted network. The state information for the call is formatted at the gate controllers based on the setup message for the call. The state information for the call is sent to the originating network edge device without maintaining the state information at the originating gate controller and at the terminating network edge device without maintaining the state information at the terminating gate controller.

Note that the term "maintained" as used herein in reference to the state information is intended to include storing and using the state information while the call is being establishing, the call is in progress and the is being released. Although the state information may be temporarily stored at the gate controllers, the state information is not maintained at the gate controller because the gate controllers do not do not use the state information (e.g., for call processing) while the call is being establishing, the call is in progress and the call is being released. In fact, the gate controllers need not stored the state information after the state information has been provided to the network edge routers because the state information for the call is accessed at the gate controllers, not the gate controllers.

3. Backbone Resource Management

Embodiments of the present invention require per-flow signaling and state at the edge of the network. It does not assume or require per flow state in the core of the network. This enables the architecture to scale to support a large number of flows. Thus, it is desirable that the backbone resource management techniques employed in concert with the above architecture be effective in managing resources on an aggregate basis. This necessitates answers to questions on scheduling and bandwidth management for a large aggregation of call (e.g. voice) flows. It is advantageous that the management of backbone resources be done through methods of aggregation, where backbone network devices (e.g. routers) only process aggregate flows of a class, rather than each individual flow.

Scheduling of packets in the data path is needed to ensure end-to-end delay is bounded to meet the requirements of the particular application. However, it is not feasible to have an individual scheduling context for each flow in the backbone, i.e. per-flow queuing and scheduling, where there may be a need to support hundreds of thousands of flows on any given backbone link. As a result, it is advantageous to look at scheduling on a per-class basis. The call/voice class can be treated as an aggregate. The call class may then either be scheduled with priority over the other classes, or with a weighted fair queuing scheduler across each of the classes.

Bandwidth management and admission control in the control path are needed to ensure that there is adequate capacity in the backbone. Per-call processing may be done in the access network, including the edge routers where the "gates" reside, as well as a very small subset of routers from the access network up to an "aggregation" network device (router) which interfaces to a high capacity core network. Aggregation routers ("AR") deal with per-flow requests and determine whether they can be satisfied. The resource management in the backbone is for aggregate capacity required between these aggregation routers. The core network is expected to have substantial capacity, such that the bandwidth required for an individual call is a very small fraction of the overall capacity. Consequently, core routers would also have a very large number of flows through them, and processing per-flow requests is infeasible.

In accordance with an embodiment of the present invention, the inventors propose a technique for managing link bandwidth on an aggregate basis which performs, in realistic scenarios, as well as techniques that manage bandwidth on a per flow basis. An $AR_I$ signals to request the aggregate bandwidth needed in the backbone for the voice class, along the path to $AR_E$. This logical path between the ingress and egress ARs is termed a "pipe." It is important that the capacity of the pipe be managed. We focus on mechanisms that actively manage the amount of bandwidth needed in the core for supporting the voice service, rather than on blocking calls. The determination of the capacity needed between ARs may be performed over multiple time-scales. Provisioning over the long term (e.g. months) is typically done based on traffic forecasts to ensure that the backbone is well-engineered. However, it is possible to adapt the capacity of the pipe to accommodate day-to-day variation. Further, resizing the pipe much more frequently—on the order of minutes or even seconds—allows the network not only to accommodate the variation during the day, but also the multiplexing effects that are seen across pipes on the backbone link due to very fine time-scale fluctuations. Experiments seem to indicate that this latter multiplexing effect appears to be the dominant benefit of frequent pipe resizing.

Figure 3:
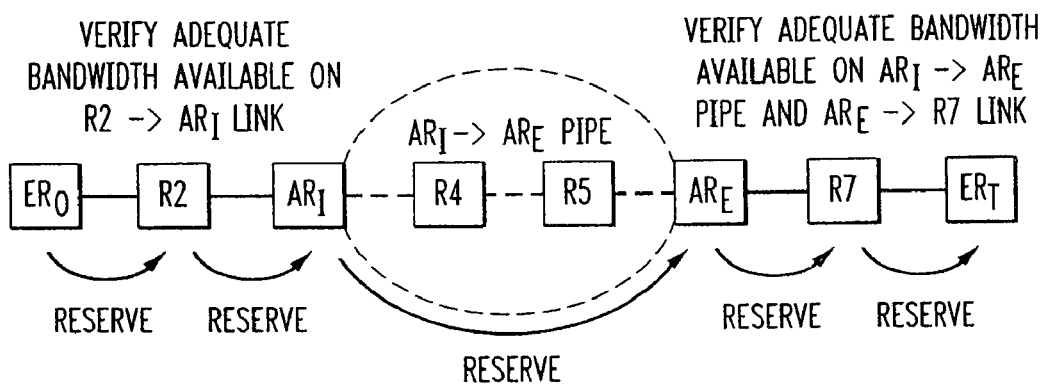
FIG. 3 illustrates network backbone reservation with pipes, according to an embodiment of the present invention.

FIG. 3 illustrates a specific example of how pipe resizing can be achieved in conjunction with the above signaling. It is assumed that the reservation messages for setting the pipe bandwidth in the backbone flow on the same path as the data. The figure, as an example, is restricted to the case where there is only a single path between $AR_I$ and $AR_E$. The originating network edge device (edge router) forwards a "RESERVE" message from the customer premises equipment ("CPE") toward the destination CPE. This message contains a flow identifier (e.g. the tuple <IP_src_addr, IP_dst_addr, src_port, dst_port> and the bandwidth required for the flow). The RESERVE is forwarded hop-by-hop along the end-to-end path until it reaches $AR_I$. Each of the routers (e.g., R2) performs an admission control test to verify that adequate capacity is available for this flow on the next-hop link. Each router also marks itself as the "previous-hop" before forwarding a RESERVE message. At $AR_I$, the format of the RESERVE message is modified before it is forwarded to hide these messages from the backbone routers. (There are several proposals that have been made in the prior art for mechanisms that can be used to hide reservation messages from being processed by backbone routers, in the context of supporting RSVP-based aggregated quality-of-service signaling). This causes the RESERVE message to be forwarded through the backbone routers without being interpreted, until it reaches the $AR_E$. $AR_E$ determines the identity of AR, using the "previous-hop" field, and executes an admission control test to check if the new flow can be accommodated on a pipe between $AR_I$ and $AR_E$. (If an egress AR were to receive a RESERVE message for which it could not find a corresponding "pipe", it would need to trigger the creation of a pipe by notifying the ingress AR.) This requires $AR_E$ to keep track of the available capacity (and per-flow state) for all the pipes terminating at that AR. $AR_E$ also modifies the format of the RESERVE message to disable the hiding of this message. The RESERVE is then forwarded hop-by-hop towards the destination, processed by the routers in the path, including $ER_T$.

There are alternate models in which an association between the ingress and egress ARs is established explicitly. For example, this may be performed by integrating the needed information about $AR_E$ with the routing system. In this case, $AR_I$ has sufficient information about the pipe to perform the admission control test when it receives a RESERVE message. In either case, if the admission control test fails, the call is blocked and the appropriate RESERVE_ACK message is generated.

Figure 4:
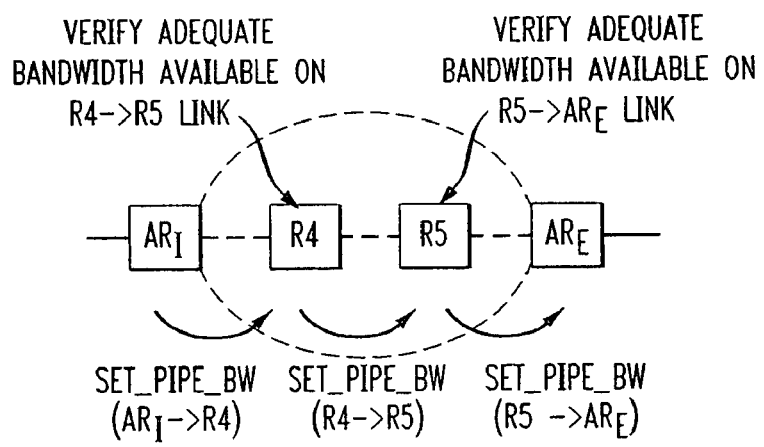
FIG. 4 illustrates pipe bandwidth management in according to an embodiment of the present invention.

To manage the pipe bandwidth between the ingress and egress ARs, aggregate quality-of-service ("QoS") signaling is used. This aggregate QoS signaling is processed hop-by-hop through the backbone as shown in FIG. 4, and the backbone routers perform admission control and resource allocation for the aggregate. Determining the size of the pipe is important. One may do it based on the peak observed over a day. However, this may lead to inefficient use of backbone links. It may be desirable to adapt to the changes in the offered load over short time scales, through re-negotiation of the capacity. As an example, the inventors conducted simulations that suggested that resizing pipes once every five minutes could save a factor of about two in capacity in all links. More frequent re-negotiation allows the network to better adapt to the dynamic needs of the traffic flow, but increases the signaling load on the backbone routers.

The inventors have conducted experiments studying the end-to-end delay behavior of voice flows using different scheduling algorithms. For example, a priority scheduling algorithm can be used where the voice queue is given non-preemptive priority over all the data queues. The data queues can then be scheduled using a scheduling algorithm such as Worst-case Fair Weighted Fair Queuing (WF2Q+). As another example, all the queues (including the voice queue) can be scheduled using WF2Q+. The inventors have found that priority scheduling provides the smallest delay and that, as the voice utilization increases, the distinction between priority and WF2Q+ reduces. The delay behavior of priority scheduling can be approached by assigning larger weight than the bandwidth requirement to the voice queue. The inventors' results indicate that aggregation does not adversely affect the performance of the voice transport. Handling all voice packets in a single FIFO queue meets the stringent delay requirements, if properly configured, i.e., either the voice queue is given priority, or when using weighted fair allocation, the voice queue is assigned a sufficiently large weight. Furthermore, the effect of synchronization of voice sources is limited.

What is claimed is:

1. A data network comprising:
    an ingress aggregation router for aggregating data flow;
    an egress aggregation router; and
    a core network backbone interfacing with both the ingress and egress aggregation routers, the backbone including a plurality of backbone routers configurable into pipes of varying capacity connecting the ingress and egress aggregation routers;
    the ingress aggregation router being configured to separately aggregate voice call flows into a single queue, to request aggregate bandwidth for voice call flows as a separate class from other classes of traffic, and to resize a pipe carrying the aggregate bandwidth and connecting the ingress and egress routers on a periodic basis;
    the ingress aggregation router further being configured to transmit capacity reservation requests through a pipe in the backbone, the capacity reservation requests being hidden from the backbone routers configured into the pipe.

2. The data network of claim 1 wherein the ingress aggregation router resizes the pipe using aggregate quality-of-service signaling.

3. The data network of claim 2 wherein the aggregate quality of service signaling is processed hop-by-hop through the backbone.

4. The data network of claim 1 wherein the pipe is resized on a daily basis.

5. The data network of claim 1 wherein the ingress aggregation router is configured to schedule voice call flows with priority over other classes of traffic.

6. The data network of claim 1 wherein the ingress aggregation router is configured to schedule voice call flows with a weighted fair queuing scheduler with other classes of traffic.

7. The data network of claim 1 wherein the egress aggregation router is configured to track available capacity on all pipes connecting to the egress aggregation router.

* * * * *